United States Patent
Hubert-Habart et al.

(10) Patent No.: US 6,281,487 B1
(45) Date of Patent: Aug. 28, 2001

(54) DEVICE FOR PROTECTING AN OPTICAL SYSTEM AGAINST EXCESS LUMINOSITY

(75) Inventors: Christophe Hubert-Habart, Meudon; Gilles Fournier, Bois D'Arcy, both of (FR)

(73) Assignee: Aerospatiale Societe Nationale Industrielle, Paris (FR)

(*) Notice: Subject to any disclaimer, the term of this patent is extended or adjusted under 35 U.S.C. 154(b) by 0 days.

(21) Appl. No.: 09/319,018
(22) PCT Filed: May 20, 1998
(86) PCT No.: PCT/FR98/01005
§ 371 Date: May 28, 1999
§ 102(e) Date: May 28, 1999
(87) PCT Pub. No.: WO98/53534
PCT Pub. Date: Nov. 26, 1998

(30) Foreign Application Priority Data

May 23, 1997 (FR) .................................. 97 06306

(51) Int. Cl.⁷ .................................................. G02B 23/08
(52) U.S. Cl. ............................................. 250/216; 359/297
(58) Field of Search .......................... 250/216; 359/297, 359/738

(56) References Cited

U.S. PATENT DOCUMENTS 3,602,576 * 8/1971 Kohler et al. ................. 350/160
3,734,592   5/1973 Sztankay et al. .
5,153,425  10/1992 Meinzer et al. .

FOREIGN PATENT DOCUMENTS 8800107   1/1988  (WO) .

OTHER PUBLICATIONS

PCT Search Report dated Sep. 2, 1998.
J. J. Dicillo, et al., "Potential Eye and Sensor Protection From Tunable Lasers by Means of Thin Film Aluminum Mirrors," Optical Engineering, vol. 33, No. 3, Mar. 1, 1994, pp. 951–956, XP000434968.

* cited by examiner

*Primary Examiner*—Stephone B. Allen
(74) *Attorney, Agent, or Firm*—Stevens, Davis, Miller & Mosher, LLP

(57) ABSTRACT

A device for protecting an optical system against the excess luminosity of an incident light beam. The device forms first and second light beams from an incident light beam. A mirror reflects the first beam which is then guided toward the optical system. The mirror includes a reflecting layer capable of being ablated, at least locally, when it is subjected to high luminous intensity. The second beam initiates the ablation process of the reflecting layer, which is continued and completed by the joint action of the first and second light beams.

8 Claims, 1 Drawing Sheet

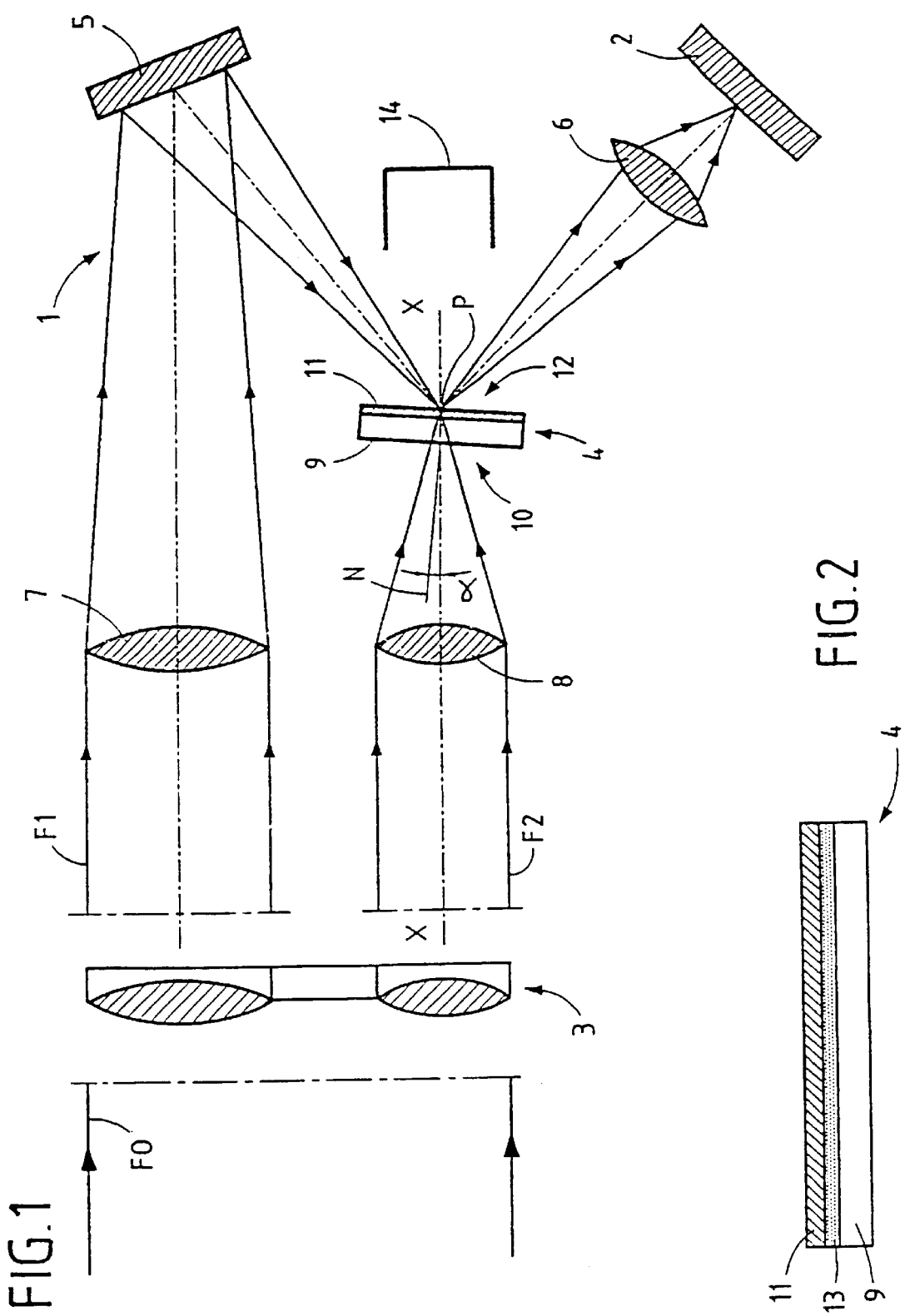

DEVICE FOR PROTECTING AN OPTICAL SYSTEM AGAINST EXCESS LUMINOSITY

BACKGROUND OF THE INVENTION

1. Field of the Invention

The present invention relates to a device for protecting an optical system against excess luminosity.

In the scope of the present invention, the term optical system is intended to mean any natural means, such as an eye, or artificial means, such as an optical sensor or a camera, capable of sensing a light beam.

2. Description of the Related Art

It is known that, in particular, the development of lasers both for civil applications and for military applications, and the diversity of existing types of lasers, in particular as regards wavelength, pulse duration, luminous energy, etc., make it necessary to use specific protection devices in order to provide effective protection of such an optical system.

Various solutions are known for providing such optical protection.

A first known solution relates to the use of protection filters, in particular:

filters with fixed rejection bands. However, it is necessary in this case to know the wavelengths liable to be encountered in the environment in question, and, further, such filters interfere with the operation of the protected optical sensors (coloration, weak transmission, etc.) and are generally ineffective against polychrommatic excess luminosity;

active filters triggered after the detection of excess luminosity. Such filters have response times that are generally long and are unsuitable for protection against pulsed laser beams; or filters which are triggered by excess luminosity and whose operation is based on nonlinear optical effects. The latter filters do not guarantee protection over a wide spectral band compatible with the operating bands of many optical sensors.

This first known solution is therefore hardly satisfactory.

A second known solution consists in using an irreversible type of protection device, that is to say one whose optical properties are degraded irreversibly above a determined energy threshold of the incident light beam, so as to prevent the latter from then reaching the optical system to be protected. Such a solution is justified by the low probability of excess luminosity existing in a light beam observed by an optical system.

A solution of this type is described in U.S. Pat. No. 3,602,576 which discloses a protection device comprising:

means for forming, from an incident light beam, a first observation light beam which is transmitted to the optical system and a second destruction light beam specified below;

a photochemical shutter comprising a reflecting metallic layer and an explosive capable of being triggered by a light beam which has luminous intensity above a predefined value;

first optical means for guiding said observation light beam toward said optical system after reflection on the metallic layer of said photochemical shutter;

second optical means for guiding said destruction light beam toward said explosive of said photochemical shutter along a second optical path, the first optical path followed by said observation light beam to said photochemical shutter being longer than said second optical path.

Thus, when the incident light beam has excess luminosity corresponding, for example, to a laser pulse, this excess luminosity is encountered in the destruction beam which then triggers said explosive, thus destroying the photochemical shutter and preventing, after destruction, the observation beam from reaching the optical system. Further, since the optical path of the destruction beam is shorter than that of the observation beam (to the photochemical shutter), the triggering of the destruction of the shutter precedes the arrival of the corresponding observation beam on the latter.

However, because of the significant duration between the arrival of the destruction beam and the explosion itself, a solution of this type is quite ineffective for the applications envisaged in the present invention, in particular for protection against lasers of short pulse durations less than 1 millisecond, since the observation beam exhibiting the excess luminosity will in this case nevertheless still reach the optical system, and further, for long enough to damage or destroy it, before said explosion and the interruption to its path.

Further, the explosion of said photochemical shutter risks very greatly damaging the other elements of the protection device, and even said optical system.

This second solution is therefore not satisfactory either.

SUMMARY OF THE INVENTION

The object of the present invention is to overcome these drawbacks. It relates to a simple, effective and inexpensive device for protecting an optical system against excess luminosity of an incident light beam, and in particular a laser of short pulse duration.

To this end, according to the invention, said device of the type comprising:

means for forming first and second light beams from said incident light beam;

an optical reflection means;

first optical means for guiding said first light beam toward said optical system after reflection on said reflection means; and second optical means for guiding said second light beam toward said reflection means along a second optical path, the first optical path followed by said first light beam to said reflection means being longer than said second optical path, is noteworthy in that said optical reflection means is a mirror comprising a reflecting layer capable of being ablated at least locally when it is subjected to a luminous intensity higher than a predefined value, and in that said first and second optical means respectively focus said first and second light beams on the same focusing point of said reflecting layer of said mirror and form first and second paths having a length difference such that, when said incident light beam has excess luminosity, said second light beam initiates ablation of said reflecting layer at said focusing point, said ablation being continued and completed by the combined action of said first and second light beams.

Thus, by virtue of:

on the one hand, the use of said mirror, the reflecting layer of which can be ablated extremely rapidly, especially compared with the response time of the aforementioned photochemical shutter; and on the other hand, the advocated destruction method combining the action of the two light beams, namely the initiation of the ablation by the second beam and the continuation and completion of said ablation by the two beams combined, the problems with the time taken to activate the protection, which exists in the device disclosed by the aforementioned U.S. Pat. No. 3,602,576, are effectively remedied and particularly effective protection is thus obtained.

Further, since only ablation of the reflecting layer or of part of it is carried out, there is only an extremely small risk of damage to the other elements of said device. The latter can therefore be reused, either as it is or by replacing said mirror, or by moving it when the reflecting layer is ablated only locally.

It will further be noted that, in addition to being simple and inexpensive, the device according to the invention is effective over a wide spectral band, on account of the corresponding properties of the mirror used.

Although such a mirror is known, its use as such, that is to say without incorporating it in the device according to the invention, does not make it possible to obtain the results and the advantages which are obtained by the present invention, and it cannot be effective enough for the applications envisaged in the present invention. This is because, for identical focusing conditions, the energy threshold per unit area for ablating the metallic layer of the mirror is generally higher than the energy threshold per unit area capable of damaging the optical systems in question.

The present invention overcomes this latter drawback:
on the one hand, by combining the energy contributions of the two light beams; and
on the other hand, by focusing these light beams onto the same focusing point, throughout the optical field.

Consequently, the characteristics of the present invention make it possible both:
to reduce the response time so as to make it compatible with pulse durations of lasers very much shorter than one millisecond; and
to increase the security of the protection of said optical system, on the one hand by improving the ablation by combined action of the two light beams and, on the other hand, by being triggered using an observation beam having a luminosity which is low and therefore less dangerous to the optical system.

Preferably, said first and second light beams are emitted from opposite sides onto the mirror. In this case, in order to reduce the back-scattering of the protection device, advantageously, said mirror comprises, on the emission side of said second light beam relative to said reflecting layer, an antireflection-treated substrate and/or an absorbing layer. The latter further makes it possible to absorb at least a fraction of said first light beam after the ablation of the reflecting layer.

Further, advantageously, the optical axis of said second light beam has an inclination relative to the normal to the plane of said mirror.

In order to improve still further the limitation of the back-scattering, this inclination should be more than the width of the back-scattering peak of said mirror. Generally, this width is between 0.3 and 0.5°, and the minimum value of the inclination will be taken as equal to 1°.

In order to maintain the effectiveness of the protection system throughout the optical field, the inclination should be selected so that the diameter of the defocusing spot at the edge of the field is of the same order of magnitude as the diameter of the spot in the focal plane. The maximum value of the inclination depends on the characteristics of the optical focusing means (numerical aperture, field, etc.).

By way of example, for an optical means of aperture f/10, the diameter of the diffraction spot is of the order of 10 $\mu$m in the visible spectrum. If the image field is equal to 1 cm, an inclination of 3° gives a defocusing spot of 25 $\mu$m diameter which is still compatible with the performance of the system.

Thus, said second light beam,
is substantially orthogonal to the plane of the mirror, which makes it possible to increase the energy concentration (needed for the ablation); but
is slightly inclined relative to the normal to said plane, which makes it possible to increase the stealth of the device according to the invention.

Further, advantageously, said device comprises:
a means for adjusting the focusing of said first and second light beams onto said focusing point, throughout the optical field; and/or
a light trap arranged in extension of the second light beam, on the side opposite the emission side of said second light beam, relative to said mirror.

Moreover, in order to increase the security of the protection yet further, advantageously, said first optical means comprise an auxiliary mirror which is arranged on said first optical path, upstream of said mirror in the direction of motion of said first light beam and which comprises a reflecting layer capable of being ablated, when it is subjected to a luminous intensity higher than a predefined value.

BRIEF DESCRIPTION OF THE DRAWINGS

The figures of the appended drawing will clearly show how the invention may be embodied. In these figures, identical references denote similar elements.

FIG. 1 schematically illustrates a device according to the invention.

FIG. 2 schematically illustrates a mirror of a device according to the invention.

DETAILED DESCRIPTION OF THE INVENTION

The device 1 according to the invention, schematically represented in FIG. 1, is intended to protect an optical system 2, for example an optical sensor or an observer's eye, against excess luminosity of an incident light beam FO. Such excess luminosity may, in particular, be generated by a laser source.

To this end, said device is of the type comprising:
means 3 of known type, preferably two separate adjacent pupils, for forming a light beam F1 and a light beam F2 from the incident light beam FO,
a mirror 4 specified below; and
a mirror 5 which is arranged on the optical path of the light beam F1 in order to guide the latter onto said mirror 4 where it is reflected, then focused by a focusing means 6 onto the optical system 2.

According to the invention, said device 1 further comprises:
a focusing means 7 for focusing said light beam F1 onto a point P of the mirror 4; and
a focusing means 8 for directly focusing the light beam F2, also onto said point P and, further, with the same magnification.

Further, according to the invention said mirror 4 comprises, as represented in FIG. 2, a transparent substrate 9 on the side 10 of the beam F2 and a reflecting layer 11 on the side 12 of the beam F1. Said reflecting layer 11, which is preferably metallic, for example made of aluminum, is capable of being ablated when it is subjected to a laser beam having a luminosity higher than a predefined value.

Thus, during normal operation, the light beam F1 derived from the incident beam FO is transmitted to the optical system 2 via the focusing means 6 and 7 and the mirrors 4 and 5. The transmission is not perturbed (low distortion) and can be carried out over a wide spectral band, in particular on account of the optical properties of the means 4 to 7 which are used.

However, when said incident light beam FO has excess luminosity, due for example to a laser source and capable of being damaging to the optical system 2, this excess luminosity which is also present in the beams F1 and F2 causes ablation of the reflecting layer 11 at least locally around the point P, which then prevents the beam F1 from reaching the optical system 2, which is thus protected.

Since, according to the invention, the path of the beam F2 in order to reach the mirror 4 is shorter than that of the beam F1, said beam F2 initiates the ablation which is then continued and completed by the combined action of the two beams F1 and F2.

Thus, by virtue of the invention, the protection obtained is:

effective, since the response time is reduced in particular by virtue of the characteristics of the mirror 4 and the initiation of the ablation by the beam F2; and reliable, since the ablation is carried out by the combined action of the two beams F1 and F2 which are focused at the same point P.

The device 1 further comprises a means for adjusting the beam F2 (not shown), for example a system with prisms, in order to harmonize the focusing of the two beams F1 and F2 onto the point P.

Further, said device 1 is simple and straightforward to produce and is inexpensive.

In addition, in order to prevent back-scattering of the beam F2 during normal operation, the mirror 4 further comprises an absorbing layer 13 arranged between the substrate 9 and the reflecting layer 11, and said substrate 9 is given an antireflection treatment.

Further, for the same purpose, the optical axis X—X of the beam F2 is inclined by an angle $\alpha$ relative to the normal N to the plane of the mirror 4.

However, this angle $\alpha$ is small and is preferably between 1 and 10° in order to improve the concentration of light energy at the point P, which is intended to ablate the reflecting layer 11.

In order to increase the stealth of the device 1 yet further, it is also possible to opacify past of the pupil of the optical channel for the beam F2.

Moreover, the device 1 comprises a light trap 14 which is centered on the optical axis X—X of the beam F2 and is arranged on the side 12 of the mirror 4.

Thus, when the mirror 4 is ablated at least locally, the beam F2 which passes through it then is recovered by said light trap 14, in particular so as to protect the optical system 2. It will be noted that, in this case, the beam F1 is at least partially absorbed by the absorbing layer 13 of the mirror 4.

Even though the device 1 is of the irreversible type, it can be readily restored to normal operation after ablation of the reflecting layer 11:

either by replacing the mirror 4 with a new mirror;

or by moving it in its plane, when the ablation is localized to a small area of reflecting layer 11.

In order to increase the protection yet further, the mirror 5 also comprises a reflecting layer capable of being ablated, when it is subjected to luminosity higher than a predefined value.

It will be noted that:

if the reflecting layer of the mirror 5 is identical to that of the mirror 4, it is ablated for higher energies, because it is subjected only to the beam F1 which, further, it not focused onto said mirror 5; and the material and the thickness of the reflecting layers of said mirrors 4 and 5 are selected in particular on the basis of the desired optical transmission quality and, above all, the energy threshold above which the protection (ablation) is to be triggered.

Of course, the device 1 according to the invention can be used as such and in many possible applications. It may, however, also be used in combination with other known means of optical protection.

What is claimed is:

1. A device for protecting an optical system against excess luminosity of an incident light beam, said device comprising:

means for forming first and second light beams from said incident light beam;

an optical reflection means;

first optical means for guiding said first light beam toward said optical system after reflection on said reflection means; and second optical means for guiding said second light beam toward said reflection means along a second optical path, the first optical path followed by said first light beam to said reflection means being longer than said second optical path, wherein said optical reflection means is a mirror comprising a reflecting layer capable of being ablated at least locally when it is subjected to a luminous intensity higher than a predefined value, and in that said first and second optical means respectively focus said first and second light beams on a same focusing point of said reflecting layer of said mirror and form first and second paths having a length difference such that, when said incident light beam has excess luminosity, said second light beam initiates ablation of said reflecting layer at said focusing point, said ablation being continued and completed by combined action of said first and second light beams.

2. The device according to claim 1, wherein said first and second light beams are emitted from opposite sides onto said mirror, wherein said mirror comprises an absorbing layer arranged on the emission side of said second light beam relative to said reflecting layer.

3. The device according to claim 1, wherein said first and second light beams are emitted from opposite sides onto said mirror, wherein said mirror comprises an antireflection-treated substrate arranged on the emission side of said second light beam relative to said reflecting layer.

4. The device according to claim 1, wherein the optical axis of said second light beam has an inclination ($\alpha$) between 1 and 10° relative to the normal to the plane of said mirror.

5. The device according to claim 1, further comprising means for adjusting focusing of said first and second light beams onto said focusing point.

6. The device according to claim 1, further comprising a light trap arranged in the extension of the second light beam, on the side opposite the emission side of said second light beam, relative to said mirror.

7. The device according to claim 1, wherein said first optical means comprise an auxiliary mirror which is arranged on said first optical path, upstream of said mirror that comprises said reflecting layer in the direction of motion of said first light beam, and which comprises a reflecting layer capable of being ablated, when it is subjected to a luminous intensity higher than a predefined value.

8. The device according to claim 1, wherein the absorbing layer is in direct contact with the reflecting layer to prevent back-scattering of the second beam.

* * * * *